April 28, 1964
R. J. COFFELT
3,130,667
SERPENTINE FRUIT PRESS
Filed Feb. 13, 1962
2 Sheets-Sheet 1
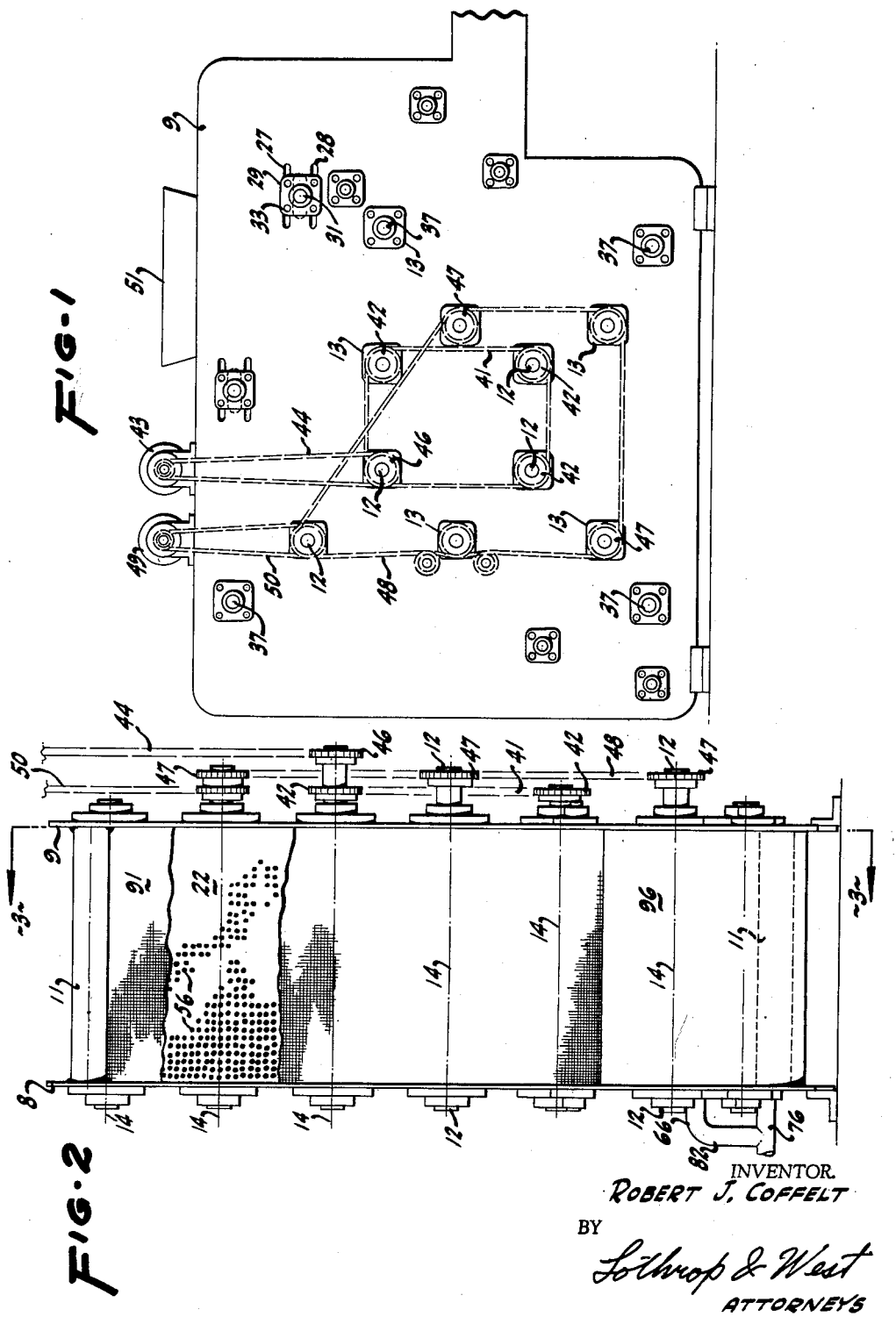
INVENTOR.
ROBERT J. COFFELT
BY
Lothrop & West
ATTORNEYS April 28, 1964 R. J. COFFELT 3,130,667
SERPENTINE FRUIT PRESS
Filed Feb. 13, 1962 2 Sheets-Sheet 2

INVENTOR.
ROBERT J. COFFELT
BY
Lothrop & West
ATTORNEYS

3,130,667
SERPENTINE FRUIT PRESS
Robert J. Coffelt, Davis, Calif., assignor to the Regents of the University of California, Berkeley, Calif.
Filed Feb. 13, 1962, Ser. No. 173,012
2 Claims. (Cl. 100—118)

My invention relates to means for utilizing pressure to express or squeeze out the juice and attendant fluid material from various commodities, more particularly grapes.

The expression of juice from various items is carried on by presses of various different sorts, for example as shown in my copending application entitled "Continuous Fruit Press" filed October 18, 1961, Serial No. 145,886.

The object of the invention is in general to provide an improved press especially adapted for use in connection with fruit such as grapes.

Another object of the invention is to provide a fruit press in which the mechanism is considerably simplified over that heretofore known.

Another object of the invention is to provide a fruit press occupying a relatively small amount of floor space yet capable of handling a relatively large amount of material.

Another object of the invention is to provide a continuously operating fruit press which separates the expressed liquid from the remaining material in a distinct fashion.

Another object of the invention is to handle the material being pressed in relatively thin layers so that the expressed liquid has an adequate chance to escape quickly from the retained material.

Another object of the invention is to provide a certain working or movement of the material being pressed so that the expelled juice can readily escape.

Another object of the invention is in general to provide mechanism complying with good practice as to sanitation, cleaning and upkeep.

Other objects together with the foregoing are attained in the embodiment of the invention described in the accompanying description and illustrated in the accompanying drawing in which:

FIGURE 1 is a side elevation of one form of serpentine fruit press constructed pursuant to my invention;

FIGURE 2 is an end elevation to an enlarged scale of the structure shown in FIGURE 1, certain portions of the filter belt being broken away to disclose the interior construction.

Figure 3:
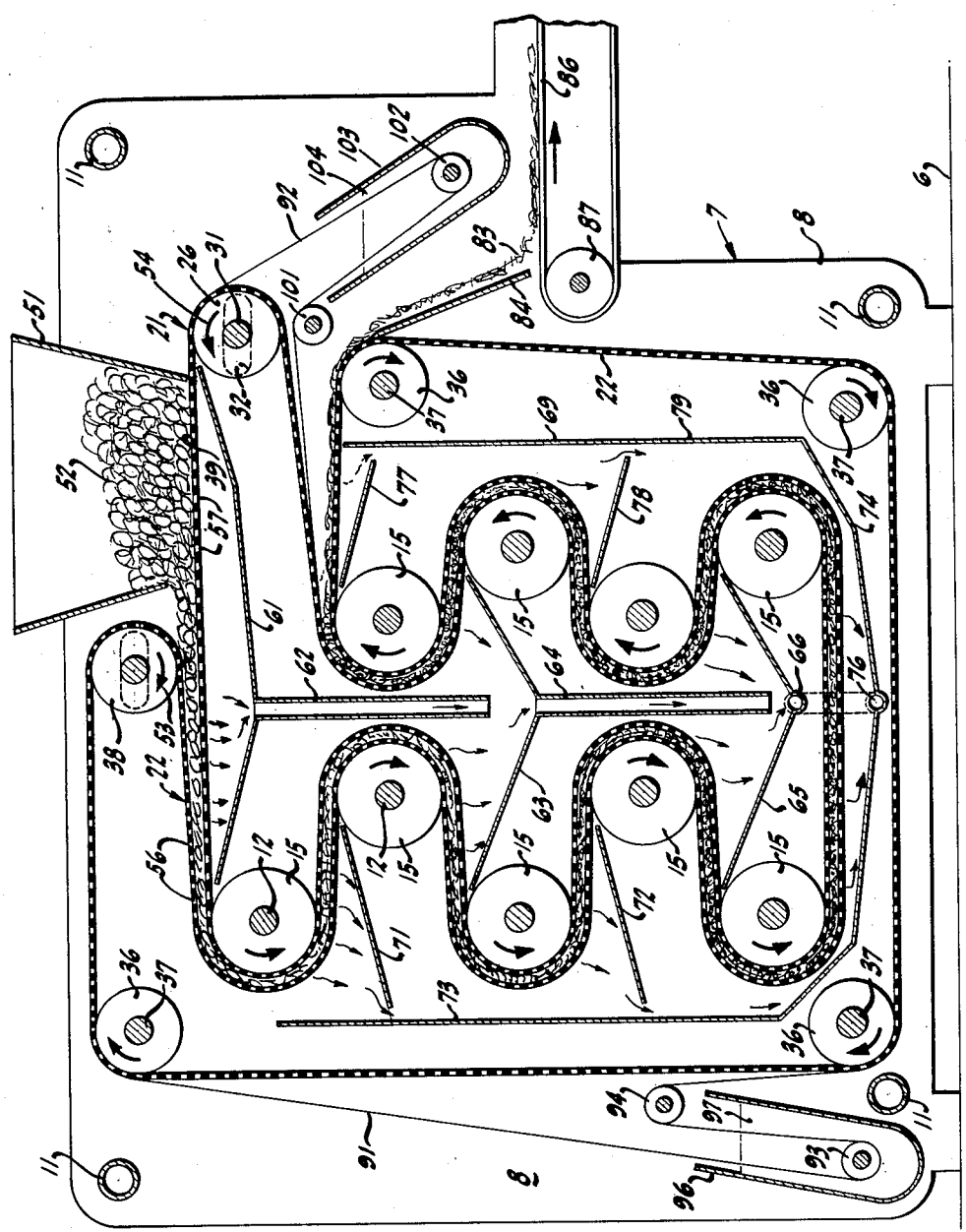
FIGURE 3 is a cross section to the same scale as FIGURE 2 and showing the interior of the serpentine fruit press, the plane of section being indicated by the line 3—3 of FIGURE 2.

Although the serpentine fruit press can readily be utilized with various different commodities, it is especially designed for use in connection with grapes and has been incorporated and is described herein as it is exemplified in that field. The press is supported on a suitable floor 6 and includes a frame generally designated 7. A pair of similar side plates 8 and 9 included in the frame are appropriately held in spaced, parallel relationship by intervening tubes 11 welded thereto.

Extending between the side plates in various locations are cross shafts such as 12 rotatably supported in appropriate journals 13 fastened onto the side plates. All of the shafts 12 are arranged with their rotational axes 14 substantially horizontal and parallel to each other. The various shafts 12 are enlarged in diameter by the provision of pressure rollers 15 of appropriate size. The rollers 15 are all much alike in size in the present instance, although they can in other installations be varied substantially in diameter if desired.

The location of the various shafts 12, that is, the location of their rotational axes 14, is according to a certain pattern. In the present instance, most of the axes 14 are arranged in approximate, mirror symmetry in the parts of the machine to the left-hand and to the right-hand of the center. On the two sides, the axes 14 are offset or staggered one with respect to the other in different amounts. On the left-hand side and considered as to their horizontal relationship, the adjacent rollers 15 are approximately tangent to successive horizontal planes. Considered vertically, the rollers on the left half are spread apart somewhat more than enough to make them tangent to a single vertical plane. On the right-hand half the rollers are approximately tangent to horizontal planes but considered vertically are closer together and so are not tangent to a single vertical plane.

Particularly in accordance with the invention, there are provided two perforated belts 21 and 22 to engage the rollers 15 in a certain way. These belts are endless and are of a width to extend into a light rubbing engagement with the side plates 8 and 9. The belts conveniently are made largely of rubber or other elastomeric material reinforced with fabric or metal strands or mesh. The belts 21 and 22 for a major part of their length are arranged in contiguous relationship, the remaining parts being quite separate. The belt 21 extends around and in immediate contact with the upper left roller 15, and also the belt 22 extends around the upper left roller 15 but on the outside of the belt 21. The two belts 21 and 22 continue in contiguous relationship and in a serpentine path around the roller 15 next to the top on the left-hand side, the belt 22 being in immediate contact with this roller whereas the belt 21 is on the outside thereof, the belts thus alternating in roller contact and radius from the axes 14. The belts continue in this fashion until they pass around the left-hand bottom roller and the right-hand bottom roller and then rise in a serpentine path in the right-hand side of the machine, finally passing around the uppermost pressure roller 15 on that side.

From this point the belt 21 is trained around a tension roller 26. The roller 26 is of smaller diameter and is adjustably mounted so as to permit tension variation in the belt 21. In the side plates there are provided appropriate slots 27 and 28 carrying the journal blocks 29 of the cross shaft 31 of the roller 26. The shaft 31 itself is movable within elongated slots 32. Suitable fastenings 33 when tightened hold the journal and shaft in adjusted location and when loosened permit the roller 26 to be shifted. The roller 26 is normally established in a position which will afford the proper tension in the belt 21.

The belt 22 after having passed around the uppermost pressure roller 15 on the right-hand side then travels around a series of idler rollers 36 appropriately carried on shafts 37 journalled in the side walls. Finally the belt 21 passes around a second tension roller 38 mounted adjustably in the frame plates in the same fashion as the roller 26 so that the belt 22 can be appropriately tensioned. The pattern of arrangement of the various rollers 15, 26, 36 and 38 is such that the belts 21 and 22 are positioned to provide an exposed upper surface 39 on the belt 21 adjacent the upper portion of the machine between the side plates 8 and 9.

The various pressure rollers 15 are all preferably driven. Preferably, the ones of the clockwise driven rollers 15 in immediate contact with the belt 22 are separately driven from those of the counterclockwise driven pressure rollers 15 in immediate contact with the belt 21. As shown in FIGURES 1 and 3, the four pressure rollers 15 closest to the center of the machine are all linked by a chain 41 passing around sprockets 42 on the appropriate shafts 12. A driving motor 43 is connected by a chain 44 to a sprocket 46 fast on one of these shafts 12. The other pressure rollers 15 have their respective shafts 12 driven through proper sprockets 47 and a chain 48. A drive motor 49 operates through a chain 50 to propel the chain 48. The motors 43 and 49 can be driven at the same speed or at different speeds.

Situated above the surface 39 and between the side walls of the framework is a feed hopper 51 designed to receive fruit such as grapes either in small clumps or in bunches. The hopper has an open bottom and a gap through which the fruit 52 feeds onto the upper exposed surface of the belt 21. Since the direction of rotation of the roller 26 is as indicated by the arrow 53, and since the direction of rotation of the roller 38 is as indicated by the arrow 54, the fruit is fed from the hopper 51 and travels between the two belts. In this portion of their contiguity the belts converge to afford in cross section a V-shaped feeding section.

As the belts advance, the fruit advances with and between them and is subjected to the pressure due to the passage of the belts around the various successive pressure rollers 15. The juice is thus expelled or is expressed from the grapes and flows out through various apertures 56 in the belt 22 and corresponding apertures 57 in the belt 21. As the belts pass around the successive pressure rollers 15, they exert particular pressure upon the intervening fruit. The belts in bending alternately as they advance also are effective to agitate and to displace or work the fruit in order that the expressed juice can escape readily therefrom.

The initially discharged juice falls into a receiving tray 61 extending between the side walls and having a discharge duct 62 leading to a subjacent discharge tray 63. A pipe 64 extends to a nether discharge tray 65 connected to a discharge pipe 66. The various trays 61, 63 and 65 gather all of the juice expressed in the central portion of the machine for release through the pipe 66. Somewhat similarly, situated under the upper left turn of the contiguous belts is a directing shelf 71 augmented by a shelf 72 beneath the subposed rollers, both of which discharge over their ends within a barrier wall 73. This confines the fluid and directs it to a bottom pan 74 connected to a discharge pipe 76. On the other side of the machine, similarly, there are trays 77 and 78 for directing the juice. A confining wall 79 leads to a bottom tray 81 merging with the drain pipe 76. An external connection 82 between the pipes 66 and 76 takes the juice from the machine for further handling.

The contiguous belts descend on the left side of the machine, traverse the bottom and then ascend on the right-hand side of the machine. In passing from the uppermost right-hand pressure roller 15 to the idler roller 36 and the tensioning roller 26, the belt runs diverge from their contiguity, the belt 22 returning on a lower path around the lowermost idlers 36 and passing around an uppermost idler 36 and finally resuming its path around the roller 38. Somewhat similarly, the belt 21 rises around the adjustable roller 26 to resume its travel toward the surface 39. The runs of the two belts 21 and 22 thus diverge so that the resulting juiceless material or pomace 83 is freed from confinement and is discharged from the belt 22 over the roller 36. The pomace is guided by a deflector plate 84 onto a discharge belt 86 trained around a roller 87 journalled in the machine frame.

During the operation of the machine the initially charged fruit 52 in appropriate form is continuously entrained between the two perforated belts and is subjected to repeated and successive flexure and pressure between the belts as the belts travel in their sinuous path around the successive driving rollers. In the discharge portion of the machine the virtually dry pomace is continuously discharged. The expelled juice travels through the perforations in the belts, is directed by various pans and plates and eventually is released from the machine through the discharge pipes 66 and 76. By appropriately adjusting the tension rollers 26 and 38, it is possible to vary the tension in the belts and thus to vary the pressure exerted by them upon the contained material. While at the present time it is preferred to have all of the driving rollers substantially the same diameter and to have them all driven at substantially the same speed, the rollers may be varied in diameter in order to increase or decrease the sharpness of the bend between the contiguous belts and also to drive some of the rollers at somewhat different speeds than the others in order to change the tension in the belts between successive drive rollers. The edges of the belts run quite close to the side walls of the frame, that is, close to the side plates 8 and 9, but no particular wear takes place at that point and no especial sealing means is usually necessary with the fruit normally handled.

Under certain circumstances, it is deemed advisable to provide each of the belts with a superposed filter belt 91 and 92. The filter belt 91 is associated with the perforated belt 22. The filter belt usually is a strip of finely woven cloth which is laid immediately against the perforated belt 22 and usually travels on and with the surface of the belt 22. In the left-hand portion of the machine the filter belt 91 leaves the belt 22 and is trained around a pair of idle rollers 93 and 94, the former being located within a wash tank 96 located between the side walls of the frame. The filter belt 91 after having traversed the circuit of the machine with the belt 22 travels through wash liquid 97 within the container 96 and is freed of any adherent or entrained material so that it can continue its traverse in clean condition.

Similarly, the filter belt 92 which is generally in immediate contact with the belt 21 throughout substantially the entire circuit of the machine is trained around a pair of idler rollers 101 and 102, the latter of which is disposed within a tank 103 containing a wash liquid 104. The filter belt 92 for each traverse through the machine is passed through the liquid 104 to be relieved of any adherent or entrained material. The idler rollers 94 and 101 are arranged in such a way that they can be appropriately adjusted to establish the desired light tension in the filter belts 91 and 92. When the filter belts are utilized, the juice expressed in the serpentine press is simultaneously filtered so that only the resulting product is discharged through the pipes 64 and 76.

What is claimed is:

1. A serpentine fruit press comprising a frame, a pair of upright side members on said frame, a plurality of counterclockwise driving rollers disposed horizontally between and journalled in said side members in a plurality of vertically arranged primary rows, a plurality of clockwise driving rollers disposed horizontally between and journalled in said side members in a plurality of vertically arranged secondary rows between said primary rows, a pair of perforated belts disposed to have predetermined portions thereof arranged in substantial contiguity, said predetermined portions being arranged in sinuous fashion alternately around said clockwise rollers and said counterclockwise rollers in said primary rows and the adjacent one of said secondary rows, one of said belts directly engaging said clockwise rollers and the other of said belts directly engaging said counterclockwise rollers, a plurality of idler rollers disposed horizontally between and journalled in said side members and engaging non-contiguous portions of said belts, means on said frame for directing fruit between the contiguous portions of said belts, all of said rollers being spaced apart more than the combined thickness of said belts and the load of fruit therebetween, means on said frame beneath each of the sinuosities of the contiguous portions of said belts for receiving juice expelled from said fruit and passing through said perforated belts, and means for driving said clockwise driving rollers and said counterclockwise driving rollers.

2. A serpentine fruit press as in claim 1 in which means are provided for driving said clockwise rollers in unison and separate means are provided for driving said counterclockwise rollers in unison.

References Cited in the file of this patent

UNITED STATES PATENTS

| | | |
|---|---|---|
| 692,823 | Bremer | Feb. 11, 1902 |
| 859,309 | MacHarg | July 9, 1907 |
| 995,283 | Patton | June 13, 1911 |
| 1,599,376 | Smith | Sept. 7, 1926 |
| 1,991,760 | McEver | Feb. 19, 1935 |

FOREIGN PATENTS

| | | |
|---|---|---|
| 31,591 | Norway | Jan. 10, 1921 |
| 665,528 | France | May 7, 1929 |
| 990,850 | France | June 13, 1951 |